Oct. 4, 1966 S. S. C. CHAO 3,277,454

BINARY CODE MAGNETIC RECORDING SYSTEM

Filed Dec. 23, 1963 3 Sheets-Sheet 1

SIDNEY S. C. CHAO
INVENTOR.

BY Stuart Lubitz
ATTORNEY

SIDNEY S. C. CHAO
INVENTOR.

BY Stuart Lubitz
ATTORNEY

SIDNEY S.C.CHAO
INVENTOR.
BY Stuart Lubitz
ATTORNEY

United States Patent Office 3,277,454

Patented Oct. 4, 1966

3,277,454

BINARY CODE MAGNETIC RECORDING SYSTEM

Sidney S. C. Chao, Palo Alto, Calif., assignor to Ampex Corporation, Redwood City, Calif., a corporation of California Filed Dec. 23, 1963, Ser. No. 332,445
9 Claims. (Cl. 340—174.1)

This invention relates to a method and apparatus for coding data. More particularly this invention relates to a binary coding method and apparatus for performing very high density recording on a magnetic medium.

There are a number of coding techniques (No-return to Zero, Return to Zero, Return to Bias and others) employed in data retrieval systems and digital computing systems that are satisfactory for low density data recording (under 1,000 bits per inch). These techniques are not effective at high packing densities (between 1,000 to 5,000 b.p.i.) and at very high packing densities (greater than 5,000 b.p.i.). At such packing densities, the common coding techniques give rise to pulse crowding, peak shifting and amplitude variations. Pulse crowding is the tendency of the resulting output signals to overlap and become inseparable. Pulse crowding is caused primarily by the difficulty of forming very narrow pulses and it is most significant in high density recordings. Peak shifting is the tendency of the output signals representative of data to shift to different positions inside and outside the bit interval. Such shifting makes the detection of the output data signals difficult and subject to error.

It is the object of this invention to provide an improved method and apparatus for coding data.

Another object of this invention is to provide an improved method and apparatus for the coding of data that is compatible with very high density recording.

Another object of this invention is the provision of a method and apparatus for the coding data at a packing density of over 5,000 bits per inch, with a reliability of –one error in $10^6$ bits or better.

Another object of this invention is the provision of a method and apparatus for the coding of data that substantially minimizes pulse crowding, peak shifting and amplitude variation.

These and other subjects will be fully understood and appreciated when the detailed description is considered in conjunction with the drawings wherein.

In general, the objects of this invention are accomplished by implementing a coding technique that utilizes a multiple of current or flux reversals for one bit of information, preferably the "Zero" of a binary code, and a single flux (or current) reversal having a relatively long duration at a substantially constant flux (or current) level for the other bit, preferably the "one" of a binary code.

Figure 6:
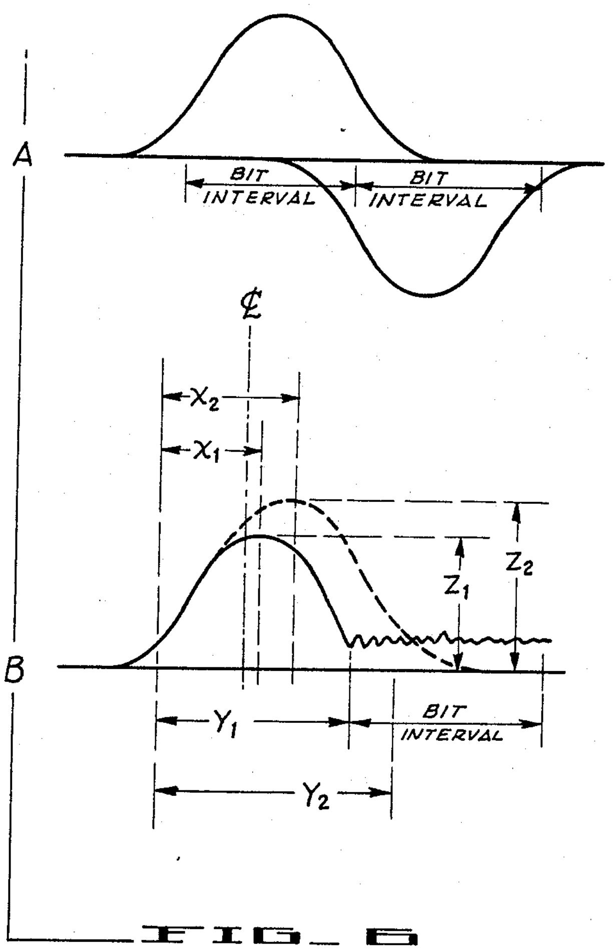
FIGURE 6 is a graphical showing of pulse crowding peak shifting, and amplitude variation in prior art devices and in the invention.

The bit represented by a number of flux reversals is equivalent to or approaches an erasure of the tape. This bit when detected, gives rise to a small amplitude ripple or effectively a "zero" output signal. The relatively long duration of flux reversal when detected will give rise to a pulse of substantial amplitude that is representative of the "one" bit. The "zero" signal by its erasure action tends to confine the "one" to its bit interval thereby minimizing the effect of peak shifting, pulse crowding and amplitude variation. This is an important aspect of the invention and it is illustrated in FIGURE 6. The FIGURE 6(*a*) shows a typical output signal wherein the recorded information is represented by similarly shaped output voltages. These output voltages may be representative of the binary "one" and may be rectified to form pulses having the same polarity. FIGURE 6(*b*) shows the effect of the "zero" erasure bit on the "one" bit. The erasure bit minimizes peak shift as shown by a comparison of $X_1$ and $X_2$ and minimizes the tendency of the bit to move outside the bit interval as shown by a comparison of $Y_1$ and $Y_2$. A comparison of $Z_1$ and $Z_2$ indicates the manner in which the amplitude is stabilized. It should be noted that this amplitude stabilization and limiting tends to maintain the magnetization on the surface of the tape. This helps to minimize pulse spreading.

Another important fact in the operation of the invention is that with a given record current the frequency characteristic of the output signal falls off quite rapidly at high packing density. For example, at 5,000 b.p.i., the output may fall at 10 to 20 db per octave. At higher b.p.i.'s, the output falls off even faster. Since it is desirable in the invention that the "zero" bit be an insignificant or very low value, this invention takes advantage of the variation of the output signal at high packing densities.

In addition other advantages of the invention are achieved by a combination of other factors, such as the fact that this coding method provides a better utilization of the available bandwidth of a recorder in comparison with other coding methods. Also, the use of an integrating type detector to smooth out the "zero" ripples results in a higher signal-noise-ratio than would result from use of a differentiator for equalizing the higher frequency components.

Figure 1:
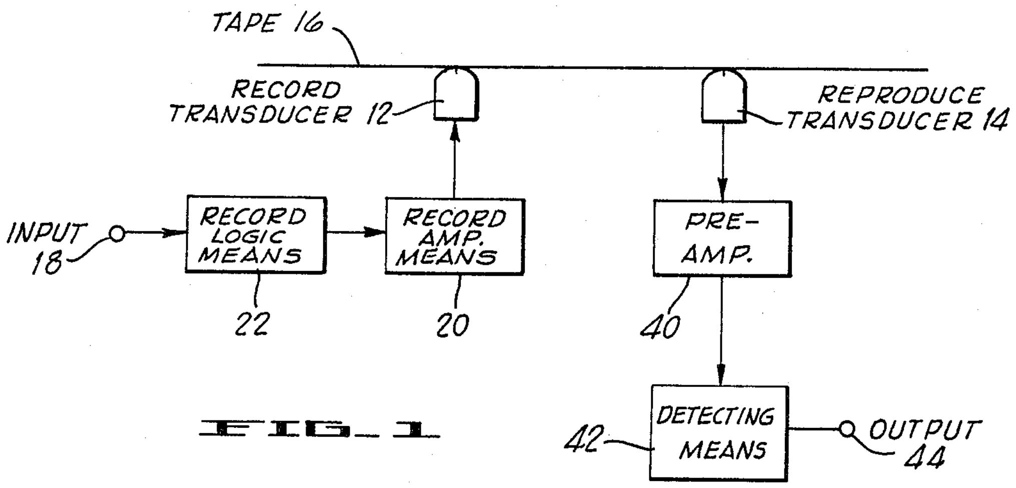
FIGURE 1 is a functional schematic diagram of the overall record and reproduce system.
Figure 2:
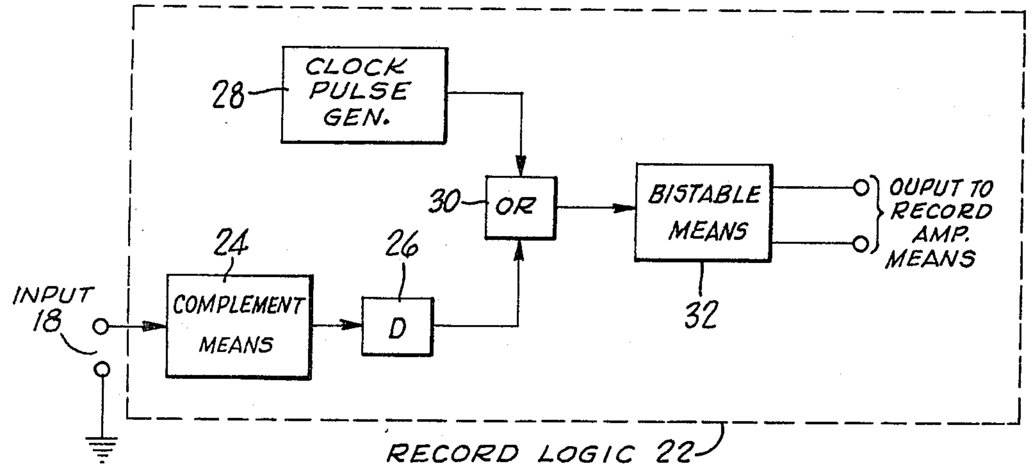
FIGURE 2 is a functional schematic diagram of the record logic means of the system shown in FIG. 1.
Figure 4:
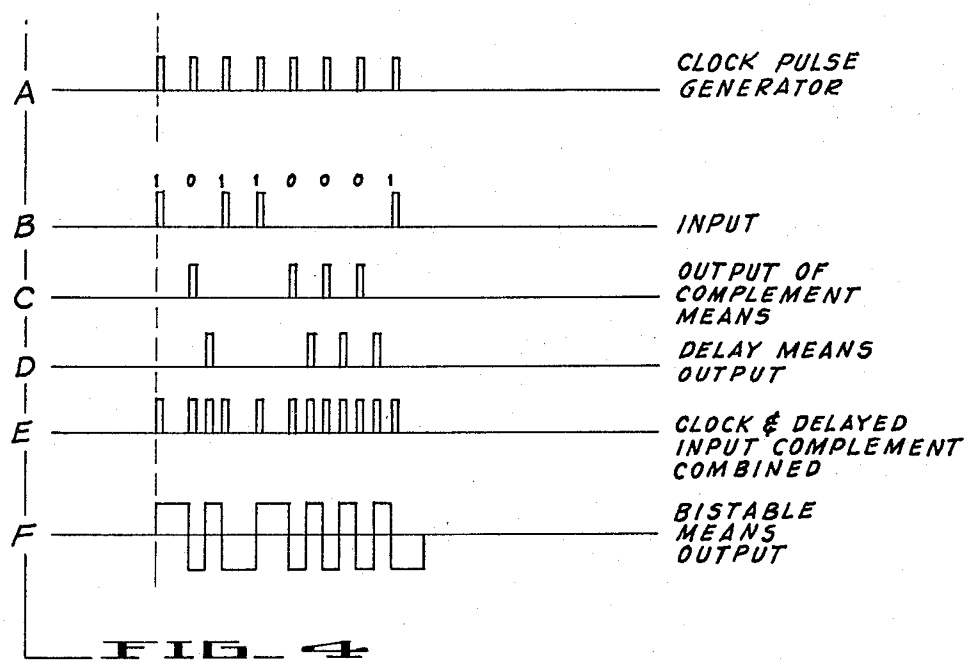
FIGURE 4 is a time-pulse diagram for the record logic means shown in FIGURE 2.

The above features and advantages of the invention can be readily understood by reference to the figures. Referring to FIGURE 1 a novel record and reproduce system for applying the invented coding method is shown. It should be understood that other and nonequivalent apparatus may also be used to apply and implement the invented coding technique. The record and reproduce system comprises a record transducer 12 and a reproduce transducer 14 that are located adjacent to or operatively coupled to a magnetic recording medium 16. The record transducer 12 and reproduce transducer 14 may be any of the well-known transducers utilized in magnetic recording such as is disclosed in U.S. Patent 2,866,-013 issued to C. S. Reis on December 23, 1958. The record transducer 12 is connected to an input terminal 18 via the record amplifier means 20 and record logic means 22. The record amplifier means 20 may be any of the well-known amplifiers that are commonly used in magnetic recording systems and more particularly in digital recording systems. The record logic means 22 is shown in detail in FIGURE 2 and will be specifically explained later in the specification. The input terminal 18 receives the incoming data which may typically be binary data wherein a "one" is represented by a pulse and a "zero" is represented by the lack of a pulse or a zero pulse. A typical input signal that may be applied to the input terminal 18 is shown in FIGURE 4(*b*).

The record logic means 22 has the broad function of converting the input signal to an output wherein one of the digits is represented by a current reversal that assumes a constant value and remains such for a relatively long period of time and the other digit is represented by a plurality of current reversals which assume a constant value for a relatively short duration. To accomplish this function the input from the terminal 18 is connected to a complement means 24. The complement means 24 would function to supply a zero output signal for each input signal that is representative of a "one" and supply a pulse or output signal of a given voltage and duration for each "zero" input signal. The output of the complement means is shown in FIGURE 4(*c*).

The output from the complement means 24 is connected to a delay means 26. The delay means 26 is conventional and may take the form of any of the well-known delay circuitry that is commonly utilized to delay a signal or a bit of information for a given period of time. In the instant application, the delay means 26 functions to delay the incoming pulses for a period that is the equivalent to one-half of a bit interval.

The duration of the bit interval is determined by the rate at which timing pulses are generated by a clock 28. In general, the clock pulses are supplied with the input data. Hence clock 28 is simply a pulse amplifier. In other arrangements the clock pulse generator 28 may take the form of a synchronized free running multivibrator having a frequency equal to the frequency at which the information is to be recorded, that is, each time a positive going portion of a pulse occurs a new bit interval will occur. The output of the clock pulse generator 28 is shown in FIGURE 4(*a*).

The time relationship of the output from the delay means 26 to the clock pulses and the output of the complement means 24 is shown by comparing FIGURES 4(*a*), 4(*c*) and 4(*d*). It can be seen from this comparison that the delay means 26 functions to delay the input from the complement means 24 approximately a half bit interval.

The output from the delay means 26 and the clock pulse generator 28 are combined in a conventional OR circuit means 30. The OR circuit means 30 functions to provide an output pulse when it is energized by either the clock pulse generator 28 or the delay means 26. The output of the OR circuit means is shown in FIGURE 4(*e*). This output is connected to a bi-stable means 32. The bi-stable means 32 may take the form of a multivibrator having two stable states or conditions of operation. Such a multivibrator assumes one state in response to a first input pulse and assumes another state in response to the next input pulse. These states may be physically represented by current levels of opposite polarity which are eventually transduced to magnetic flux levels. Accordingly, the bi-stable means or multivibrator 32 is switched from one state to the other on the occurrence of each pulse that is transmitted from the OR circuit means 30. The output signal developed by the bi-stable means 32 is shown in FIGURE 4(*f*). This output is connected to the record amplifier means 20 and results in the energization of the record transducer 12 to record a signal conforming to the output of the bi-stable means 32.

Figure 5:
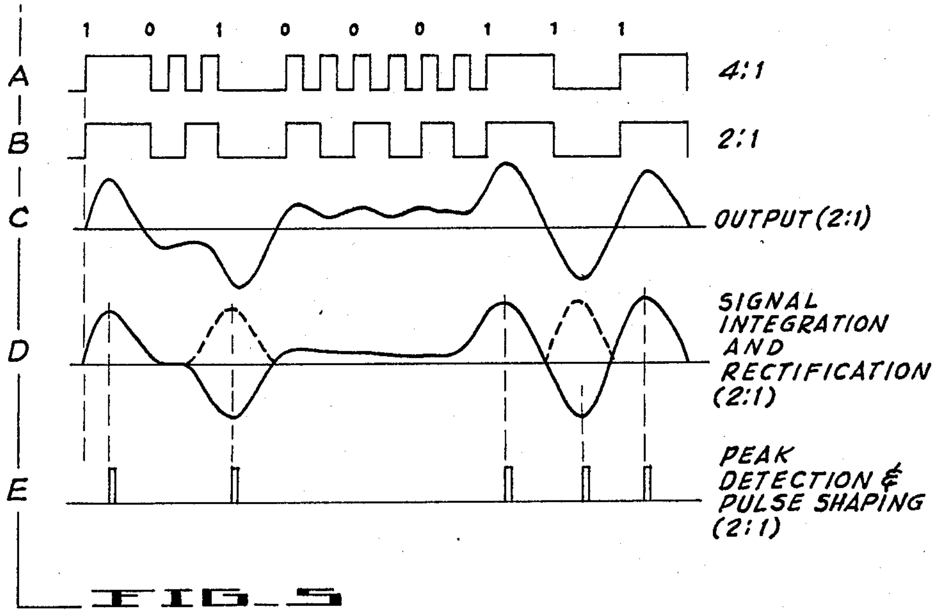
FIGURE 5 is a time-waveform diagram for a portion of the record and reproduce system shown in FIGURE 1.

The idealized recorded signal may be as shown in FIGURE 5(*b*). This recorded signal has two flux reversals for each "zero" that is recorded and a single flux reversal for each "one" that is recorded. It is of course within the scope of the invention to represent each "one" by a single flux reversal and each "zero" by four flux reversals as shown in FIGURE 5(*a*) or for that matter any other plurality of flux reversals.

The reproduce transducer 14 is adapted to sense the recorded bits of data or flux reversals that appear on the magnetic recording medium 16. Typically the reproduce transducer 14 may comprise a ferrite core with a glass or vacuum deposited gap and a coil operatively coupled to the ferrite core. The reproduce transducer 14 is connected to a preamplifier circuit means 40 that is adapted to amplify the transduced signal to a suitable amplitude. The output from the reproduce transducer 14 and the preamplifier means 40 is shown in FIGURE 5(*c*) and generally contains a low amplitude ripple signal where a "zero" has been recorded. The preamplifier means 40 is in turn connected to a detecting means 42 that is connected to the output terminals 44. The detecting means 42 is preferably an integrator type of detecting means. Integrator or integrating circuit means are well known in the art and may be formed from various combinations of resistors, capacitors and inductors. The integrator type of detecting means tends to eliminate the ripple signals that may be attributable to the zero erase portion of the recorded signal. As shown in FIGURE 5(*d*), after the output signal of the preamplifier means 40 is passed through the integrator type detecting means 42 the ripple portion of the output signal is substantially eliminated. The detecting means 42, in addition to removing the ripple signal may contain rectification means that rectifies the negative pulses which are representative of recorded "one" bits of information. The rectified portion of the output signal is shown in FIGURE 5(*d*) as broken lines.

Figure 3:
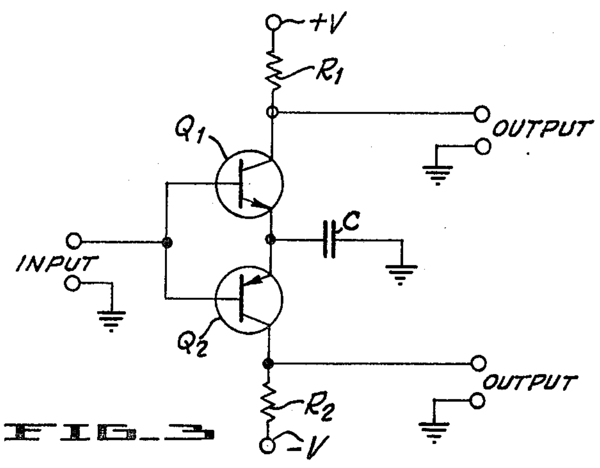
FIGURE 3 is an electrical schematic diagram of a detecting means.

A solid state type of detecting means or slope detector circuit is shown in FIGURE 3. This peak detecting means 42 generally comprises a pair of transistors Q1 and Q2 having their bases connected to an input terminal and having their emitters connected and also connected to a capacitor C that is in turn connected to ground. The collectors of the transistors Q1 and Q2 are connected to resistors R1 and R2, respectively which are in turn connected to a positive voltage source +V and a negative voltage −V respectively. The output from the peak detecting means is taken from the collectors of the transistors Q1 and Q2. The capacitor C tends to follow the input amplitude until it reverses direction, then one transistor cuts off and the other transistor starts to conduct. One output gives the positive peaks and the other the negative peaks. This circuit can detect peaks quite reliably under conditions of severe amplitude variation as is caused by pulse crowding or partial dropouts resulting from tape imperfections and temporary head-to-tape separation. A slope detector circuit similar to the one shown in FIGURE 3 is described in detai lin U.S. Patent 3,064,243 issued on November 13, 1962 to L. H. Thompson.

In summary an important aspect of the instant invention is a technique or method of coding binary data so that reliable high density recording is made possible. This coding technique involves applying to a magnetic recording medium a single flux reversal that attains a constant flux level for a relatively long period of time to represent one state of a binary digit and applying a plurality of flux reversals that are maintained for a relatively short interval to represent the other state of a binary digit. The plurality of flux reversals are at such a frequency that they amount to an erase signal or an erasure of the tape for one of the binary states.

The above described code has the advantages that it can be implemented with relatively simple record logic and reproduced with relatively simple reproduce electronics. The invented zero erase code requires a relatively narrow bandwidth since it is only necessary to be concerned with the height of the bits of data represented by the single flux reversal. It should also be recalled from the introductory portion of the specification that the disclosed coding techniques minimizes peak shifting, pulse crowding and amplitude variation. The system also has the advantage of a high degree of reliability. An experimental system including the invention and recording at densities of 5,000 b.p.i. has been operated at better reliability than one error in $10^6$ bits of information.

While the above detailed description has shown, described and pointed out the fundamental novel features of the invention as applied to a preferred embodiment, it will be understood that various omissions and substitutions and changes in the form and details of the device and method illustrated may be made by those skilled in the art, without departing from the spirit of the invention. It is the intention, therefore, to be limited only as indicated by the scope of the following claims.

What is claimed is:

1. In a method for high density recording on a magnetic medium input data that is represented by two discrete levels, the steps comprising:
representing one of said discrete levels by a multiplicity of flux reversals which essentially erase the magnetic medium;
representing the other of said discrete levels by a single flux reversal; and
applying said flux reversals to said medium in the form of a continuous wave.

2. In a method for high density recording on a magnetic medium input data that is represented by two discrete levels, the steps comprising:
representing one of said discrete levels by a multiplicity of flux reversals which essentially erase the magnetic medium;
representing the other of said discrete levels by a single flux reversal; and
applying said flux reversals to said medium;
whereby high bit packing densities are achieved and amplitude variations and peak shift are minimized.

3. In a method for recording on a magnetic medium input data that is represented by a plurality of discrete levels, the steps comprising:
deriving a multiplicity of flux reversals that essentially erases said magnetic medium to represent one of said discrete levels;
deriving a single flux reversal to represent another of said levels; and
applying said flux reversals to said magnetic medium.

4. In a method for recording on a magnetic medium input data that is represented by a plurality of discrete levels, the steps comprising:
deriving a multiplicity of flux reversals that essentially erases said magnetic medium to represent one of said discrete levels;
deriving a single flux reversal to represent another of said levels;
recording said flux reversals on said magnetic medium; and
detecting said recorded flux reversals with a means that tends to smooth out the multiplicity of flux reversals;
whereby only said single flux reversals are detected as output voltages.

5. In a method for recording on a magnetic medium input data that is represented by a plurality of discrete levels, the steps comprising:
recording a multiplicity of flux reversals that essentially erase said magnetic medium to represent one of said discrete levels; and
recording a single flux reversal to represent the other of said discrete levels, said single reversal resulting in a significant recorded flux pattern which when detected gives rise to a distinct signal relative to said multiplicity of reversals.

6. In a recording system for recording information on a magnetic medium wherein information input signals are supplied to the system in the form of at least two different types of signals, the combination comprising:
a record logic means for generating a single current reversal signal when one of said input signals is supplied to said system and for generating a multiplicity of current reversal signals to essentially erase said magnetic medium when another of said input signals is supplied to said system;
record amplifier means for amplifying said signals generated by said record logic means;
said record amplifier means operatively coupled to said record logic means; and
a record transducer for recording the signals amplified by said record amplifier means on said magnetic medium;
said record transducer operatively coupled to said magnetic medium and said record amplifier means.

7. The structure defined by claim 6 wherein said record logic means comprises:
a complement means for generating the complement of said input signals;
a delay means for delaying the signals generated by the complement means a given period;
said delay means operatively coupled to said complement means;
a clock pulse generator means for generating pulses at regularly operated time intervals;
OR circuit for combining the signals generated by the clock pulses generator means and the delayed complement signals;
said OR circuit means operatively coupled to said delay circuit means and said clock pulse generator means; and
a bi-stable means for generating a pulse of a different plurality for each output signal of said OR circuit means;
said bi-stable means operatively coupled to said OR circuit means.

8. In a recording system for recording information on a magnetic medium wherein information input signals are supplied to the system in the form of at least two different types of signals, the combination comprising:
a record logic means for generating a single current reversal signal when one of said input signals is supplied to said system and for generating a multiplicity of current reversal signals which essentially erase the magnetic medium when another of said input signals is supplied to said system; and
a record transducer for recording the signals generated by said record logic means on said magnetic medium;
said record transducer operatively coupled to said magnetic medium and said record logic means.

9. The structure defined in claim 8 wherein:
a reproduce transducer means for sensing the signals recorded on the magnetic medium is operatively coupled to said magnetic medium; and
an integrator detector means for detecting and for shaping the signals sensed by said reproduce transducer;
said integrator detector operatively coupled to said reproduce transducer.

References Cited by the Examiner

UNITED STATES PATENTS

| | | | |
|---|---|---|---|
| 2,917,726 | 12/1959 | Golden et al. | 340—174.1 |
| 3,217,329 | 11/1965 | Gabor | 346—74 |

BERNARD KONICK, *Primary Examiner.*

IRVING SRAGOW, *Examiner.*

A. I. NEUSTADT, *Assistant Examiner.*